United States Patent [19]
Watson

[11] 3,981,323
[45] Sept. 21, 1976

[54] REMOVABLE FLUID HOLDING TANK FOR VEHICLE

[76] Inventor: Clarence V. Watson, 4715 Rivercrest Drive North, Salem, Oreg. 97303

[22] Filed: Jan. 13, 1975

[21] Appl. No.: 540,421

[52] U.S. Cl. .............................. 137/344; 137/354; 280/5 A
[51] Int. Cl.² .......................................... B60P 1/00
[58] Field of Search ...... 137/344, 351, 354, 355.12; 280/5 A; 4/8, 11, 114, 210; 296/23 A

[56] References Cited
UNITED STATES PATENTS

| | | | |
|---|---|---|---|
| 1,234,026 | 7/1917 | Hilts | 280/5 A |
| 1,385,437 | 10/1921 | Ellerman | 296/23 R |
| 1,432,740 | 10/1922 | Le Blanc | 4/8 |
| 1,757,429 | 5/1930 | Jantsch | 280/5 A |
| 1,859,925 | 5/1932 | Kelley | 4/8 |
| 2,817,091 | 12/1957 | Painter | 4/11 X |
| 2,817,846 | 12/1957 | Stift | 4/8 X |
| 3,570,016 | 3/1971 | Ellis et al. | 4/8 |
| 3,730,212 | 5/1973 | Walch | 137/355.12 |
| 3,766,575 | 10/1973 | Grengs | 4/210 |

FOREIGN PATENTS OR APPLICATIONS 689,050   3/1953   United Kingdom.................... 4/11

Primary Examiner—Arnold Rosenthal
Attorney, Agent, or Firm—Kolisch, Hartwell, Dickinson & Stuart

[57] ABSTRACT

A removable waste fluid holding tank for use with a vehicle. A pair of U-shaped supports straps are suspended below the body of the vehicle with the base portion of the strap farthest inwardly from the side of the vehicle lower than the other strap. The tank is constructed to rest on the straps under the body of the vehicle and has an indentation in its base for receiving a portion of one of the straps to inhibit horizontal removal of the tank from the straps. The tank has inlet and vent connections at one end thereof to which drain and vent conduits may connect the tank to plumbing in the vehicle. Within the tank a conduit connects the inlet opening with the base of the tank. A handle is provided for lifting the tank slightly to release it from the strap, allowing it to be pulled horizontally therefrom after such release.

4 Claims, 5 Drawing Figures

REMOVABLE FLUID HOLDING TANK FOR VEHICLE

BACKGROUND AND SUMMARY OF THE INVENTION

This invention relates to a fluid receiving and holding tank for use with vehicles.

The use of recreational trailers and motorized homes has increased dramatically in recent years. Most such vehicles have sinks and other fluids using devices in them from which waste fluids must be drained periodically. However, in many areas it is now illegal to drain such fluids from a vehicle directly onto the ground.

A general object of the present invention is to provide a novel holding tank for receiving and holding waste fluid until such time as the vehicle is moved to a suitable sewer facility where it may be emptied. Another object of the invention is to provide a novel holding tank which is so constructed as to fit within support members suspended beneath the body of the vehicle and having an indentation in one wall of the tank to receive a portion of a support member to inhibit removal of the tank from the support members until such time as such is desired by the user.

Yet another object is to provide a novel holding tank assembly which can be installed and used with such a recreational vehicle in a very simple and economic manner.

DRAWINGS

These and other objects and advantages will become more fully apparent as the following description is read in conjunction with the drawings, wherein:

FIG. 2 is an enlarged view taken generally along the line 2—2 in FIG. 1, with portions broken away;

FIG. 3 is a view taken generally along the line 3—3 in FIG. 2;

DETAIL DESCRIPTION OF AN EMBODIMENT OF THE INVENTION

Figure 1:
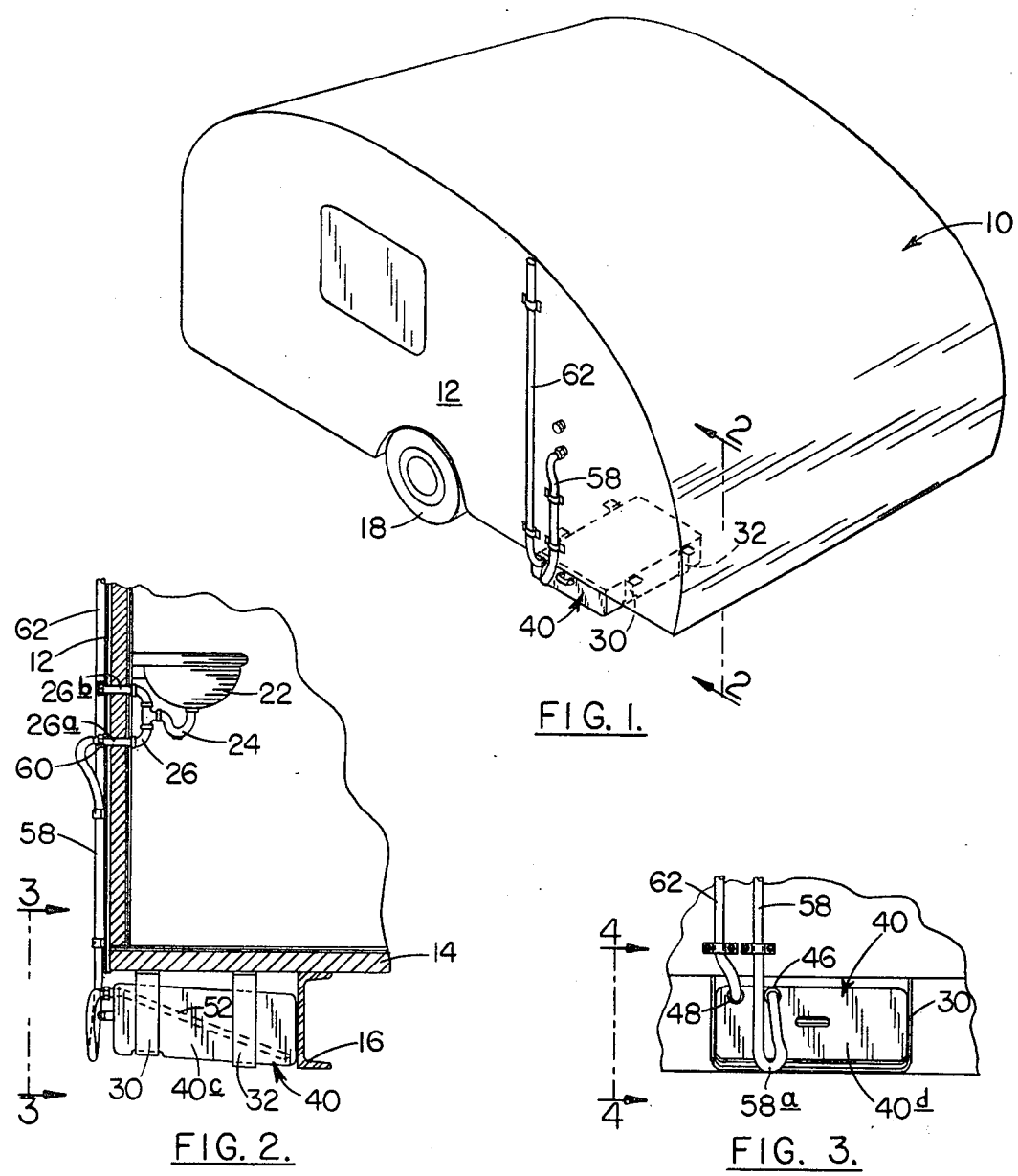
FIG. 1 is a perspective view of a recreational trailer on which a holding tank assembly according to the invention is supported.

Referring to the drawings, and first more specifically to FIG. 1, at 10 is indicated generally a recreational trailer having a side wall 12 extending along one side thereof and a floor 14 (see FIG. 2). Body 10 is supported on an underlying frame. A channel 16 forming a portion of the frame for the trailer and extending longitudinally of the trailer is illustrated in FIG. 2. The frame and vehicle body 10 are supported above the ground on wheels 18. As is seen in FIG. 2, channel member 16 is spaced inwardly on the vehicle from side wall 12.

Referring to FIG. 2, at 22 is indicated a sink supported on wall 12 of the vehicle. The plumbing for the sink includes a drain having a P-trap 24 and a bifurcated drain and vent unit 26, also referred to as a double-putter unit. Unit 26 has a lower drain branch 26a and an upper vent branch 26b. Both branches 26a, 26b extend through side wall 12 and terminate a short distance outside the vehicle.

A pair of substantially U-shaped support strap members 30, 32 are secured to and depend from the underside of floor 14 of the vehicle intermediate side wall 12 and frame beam 16. As is seen in FIGS. 2 and 4, the horizontally disposed base portion 30a of member 30 is supported at a slightly higher elevation than is horizontally disposed base portion 32a of member 32.

At 40 is indicated generally a holding tank according to the invention constructed of a liquid impervious material. The tank is an elongate hollow body having a substantially flat top 40a, opposed upright side walls 40b, 40c projecting downwardly from opposite sides of top 40a, a front end wall 40d extending between side walls 40b, 40c, a rear end wall 40e, and a bottom wall, or base, 40f, extending between the opposed side walls and the front and rear end walls. Adjoining edges of the various walls are integrally joined together to form a liquid impervious enclosure. A handle 41 is secured to front end wall 40d.

Figure 4:
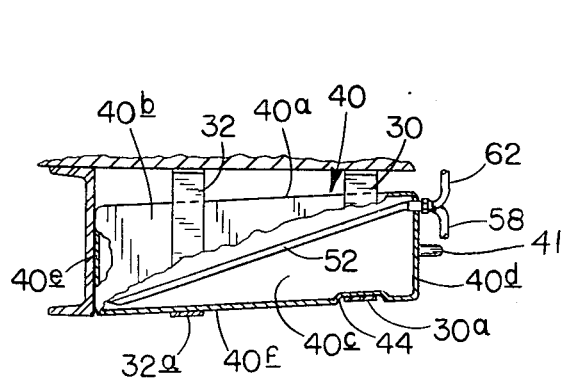
FIG.4 is an enlarged view taken generally along the line 4—4.
Figure 5:
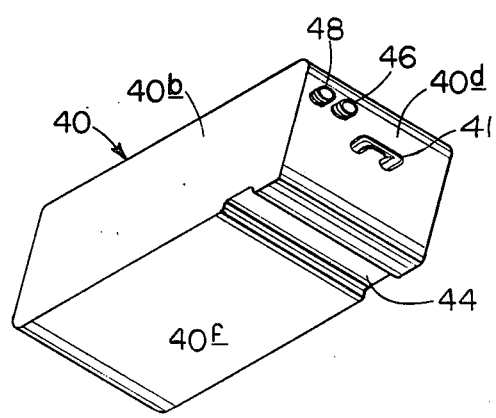
FIG. 5 is a bottom perspective view of the tank separated from the vehicle.

As is best illustrated in FIGS. 4 and 5, base 40f of the tank has an indentation 44 extending thereacross which is adapted to receive base portion 30a of strap 30 therein when the tank is in operative position, as illustrated in FIGS. 2 and 4.

Opposed side walls 40b, 40c are parallel and laterally spaced apart a distance slightly less than the distance between the opposed, upright legs of support members 30, 32, respectively. Top and bottom walls 40a, 40f are substantially parallel, and when received in supporting position on support members 30, 32 as seen in FIGS. 2 and 4, incline downwardly on progressing inwardly from side wall 12 toward beam 16. Front end wall 40d and rear end wall 40e are substantially parallel and are disposed at angles other than 90° relative to the top and bottom walls. Front wall 40d is disposed at an angle greater than 90° relative to base wall 40f and rear wall 40e is disposed at an angle less than 90° relative to base wall 40f. With this construction, when the tank is supported on members 30, 32, its rear end wall may abut flush with beam 16 and its front end wall will be disposed substantially upright adjacent side wall 12.

The height of tank 40 is less than the distance between base portion 30a of support member 30 and the underside of floor 14 of the vehicle. This permits the tank to be lifted slightly, whereby the major portions of base 40f will clear the base portion of support member 30. Such lifting to clear base 30a of member 30 permits the tank to be slid horizontally outwardly from the support members. Horizontal removal of the tank, however, is inhibited when the tank is resting on the supports with base portion 30a received in indentation 44. This prevents the tank from sliding from its supports until such time as it is desired to remove it.

An inlet, or fill opening, or port, 46 extends through front end wall 40d adjacent the top of the tank and a vent opening, or port, 48 extends through the front end wall adjacent opening 46. An elongate conduit, or tube, 52 extends from opening 46 to a region closely adjacent the base of the tank adjacent rear end wall 40e which will be the lowest portion of the tank when in its supported operative position.

An elongated, flexible drain tube, or conduit, 58 is connected at one of its ends to inlet opening 46 and is detachably connected at its opposite end to the lower, or drain, branch 26a of the double-putter unit. The lower end of tube 58 connects with tube 52 in the tank to provide a continuous conduit for channeling fluid from the sink to the base of the tank.

It will be recognized, as illustrated in FIGS. 2 and 3, that tube 58 has sufficient length and flexibility than an expanse thereof is formed in a reverse bend 58a outside the tank. Reverse bend 58a is at, or lower than, the base of tank 40.

An elongated, flexible vent tube, or conduit, 62 is connected at one of its ends to vent opening 48. Tube 62 extends from the top of the tank along the outside of the camper and is secured at its opposite end above sink 40.

Describing the operation of the apparatus, the tank is supported in support members 30, 32 beneath floor 14 of the vehicle. In such supported position indentation 44 in the base of the tank receives a portion of support member 30 to inhibit horizontal removal of the tank from the vehicle. With conduit 58 connected at its opposite ends to drain branch 26a and inlet opening 46 of the tank, when waste liquid is drained from the sink, it flows into and is held in tank 40. Gas displaced from the holding tank by the liquid is vented through conduit 62. Throughout operation, a quantity of fluid is held in the reverse bend portion 58a of tube 58. Upon reaching a sewer facility, where the holding tank can be emptied, it is a simple matter to disconnect the upper end of conduit 58 from drain branch 26a and lower it below the evaluation of the base of the tank. This produces a gravity flow of fluid from the tank through tubes 52, 58 to empty the tank. With tube 52 extending to the lowest region of the tank, the tank may be substantially completely emptied of waste fluid.

Should it be desired to remove the tank from the vehicle, it is a simple matter to lift the front end of the tank slightly whereby the base can clear support member 30 and it is then slid horizontally outwardly from under the vehicle.

While a preferred embodiment of the invention has been described herein, it should be apparent to those skilled in the art that variations and modifications are possible without departing from the spirit of the invention.

What is claimed and desired to secure by Letters Patent:

1. In combination with a vehicle having a body with plumbing therein,
    a liquid holding tank below said plumbing,
    conduit means extending from said plumbing to the tank, said conduit means connecting with the top of the tank and extending into the tank to a region adjacent the base of the tank and at said region communicating with the interior of the tank, said conduit means further including an expanse outside said tank at an elevation below the base of the tank, and
    means detachably connecting said conduit means to said plumbing, said conduit means on disconnection from said plumbing being adjustable to provide for the draining of fluid under gravity from said tank.

2. In combination with a vehicle having a frame and a body with plumbing therein mounted on said frame with the underside of the body spaced above the ground,
    a liquid holding tank,
    support means secured to said vehicle releasably supporting said holding tank beneath said body with an extremity of the tank adjacent a side of said body, said support means supporting said tank with the base of the tank inclined downwardly progressing inwardly from said side of said body, releasable indent-detent means presented between said support means and the tank operable to lock the tank from displacement laterally of said body, said releasable indent-detent means having a construction whereby with lifting of the tank to raise it from said support means the tank is free to be displaced laterally of said body,
    drain conduit means connecting said plumbing in said body and said tank with the latter in receiving relationship to fluid flowing from said plumbing through said drain conduit means, and
    vent conduit means connecting with said tank extending upwardly therefrom.

3. The combination of claim 2, wherein said drain conduit means communicates with the interior of said tank adjacent the base of said tank, and said drain conduit means is detachably connected to said plumbing and is flexible, whereby when the drain conduit means is disconnected from the plumbing it is adjustable to provide for the draining of fluid under gravity from said tank.

4. The combination of claim 2, wherein said drain means is connected to the plumbing by detachable means and is flexible, the drain conduit means connects with the top of the tank and thence extends into the tank to a region adjacent the base of the tank where such is in communication with the interior of the tank, and the drain conduit means further includes an expanse outside the tank at an elevation below the base of the tank, said drain conduit means on being disconnected from said plumbing being adjustable to provide for the draining of fluid under gravity from said tank.

* * * * *